US006935171B2

(12) United States Patent
De Haas et al.

(10) Patent No.: US 6,935,171 B2
(45) Date of Patent: Aug. 30, 2005

(54) DEVICE AND METHOD FOR DETECTING OVERLAPPING OBJECTS

(76) Inventors: Jacobus Johannes De Haas, P.O. Box 95321, 2509 CH, The Hague (NL); Frank Pieter Van Pomeren, P.O. Box 95321, 2509 CH, The Hague (NL); Gerardus Petrus Antonius Paulus Van Der Zon, P.O. Box 95321, 2509 CH, The Hague (NL)

( * ) Notice: Subject to any disclaimer, the term of this patent is extended or adjusted under 35 U.S.C. 154(b) by 0 days.

(21) Appl. No.: 10/296,057

(22) PCT Filed: May 14, 2001

(86) PCT No.: PCT/EP01/05698

§ 371 (c)(1),
(2), (4) Date: Sep. 10, 2003

(87) PCT Pub. No.: WO01/89724

PCT Pub. Date: Nov. 29, 2001

(65) Prior Publication Data

US 2004/0035200 A1 Feb. 26, 2004

(30) Foreign Application Priority Data

May 23, 2000 (NL) ............................................ 1015266

(51) Int. Cl.[7] .................................................. G01L 5/04
(52) U.S. Cl. ......................................................... 73/159
(58) Field of Search .......................... 73/158, 159, 160; 271/121

(56) References Cited

U.S. PATENT DOCUMENTS

| | | | | | |
|---|---|---|---|---|---|
| 5,035,414 | A | * | 7/1991 | Shibanaka et al. | 271/227 |
| 5,140,166 | A | * | 8/1992 | Gerlier | 271/227 |
| 6,345,170 | B1 | * | 2/2002 | Nakazato et al. | 399/388 |
| 6,565,079 | B1 | * | 5/2003 | Kakegawa et al. | 271/125 |
| 2001/0042956 | A1 | * | 11/2001 | Minoru et al. | 271/265.04 |
| 2004/0245706 | A1 | * | 12/2004 | Mitsuya et al. | 271/121 |

FOREIGN PATENT DOCUMENTS

| | | |
|---|---|---|
| DE | 198 23 101 | 11/1998 |
| EP | 0 650 911 | 5/1995 |

* cited by examiner

*Primary Examiner*—Max Noori
(74) *Attorney, Agent, or Firm*—Young & Thompson

(57) ABSTRACT

Device for detecting overlapping objects in a stream of transported flat objects in a transport path that comprises a measurement path, in which use is made of a braking roller in the measurement path. The device furthermore comprises a sensor for the passing speed of objects. If there are overlapping objects in the measurement path, the effect of a deceleration by the braking roller on the passing speed will be greater than if just one object is present in the measurement path, on account of the decelerated object lagging behind relative to the rest of the series of overlapping objects.

15 Claims, 2 Drawing Sheets

DEVICE AND METHOD FOR DETECTING OVERLAPPING OBJECTS

A. BACKGROUND OF THE INVENTION

Figure 1:
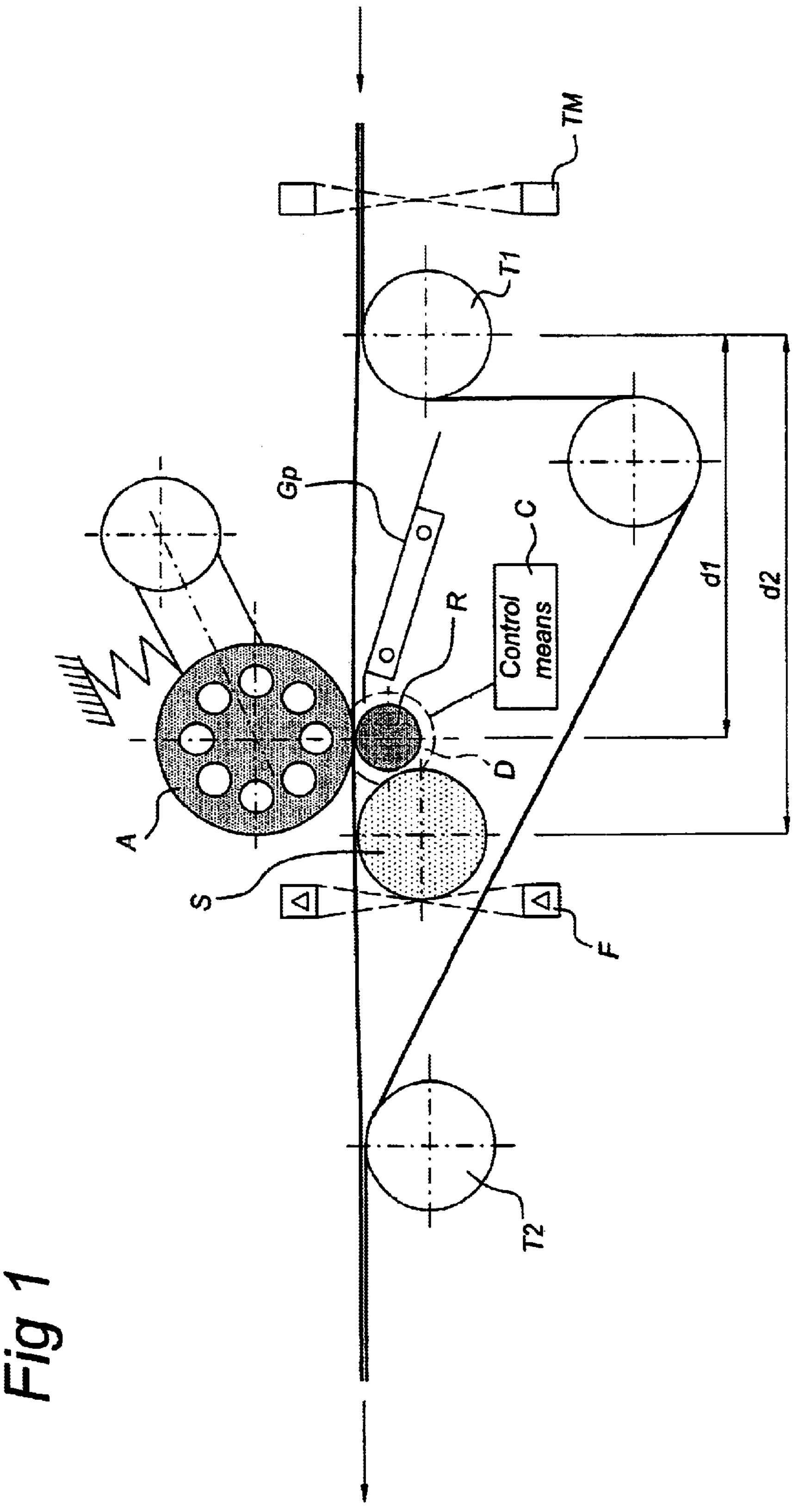

The invention relates to a device and a method for detecting overlapping objects in a transport path for flat objects, such as letters etc., whereby the transport path comprises a measurement path, in which measurement path a braking device is located by which a passing object or an object from a series of overlapping passing objects is decelerated in the measurement path.

The operation of devices of this kind is often based on causing, and then measuring or observing, changes in the total length of objects in a series of overlapping objects. This length change may either occur as a consequence of the existing properties of the transport system in question or be forced by mechanical means, such as a braking device in the form of a braking roller. The length change can be determined with photocells. This method can, however, only detect overlaps in a series of objects that overlap one another partially or if a total overlap between the measuring points changes into a partial overlap.

In the devices according to this prior art it is not possible to detect total overlaps that also remain total during the measurement, since in this case the total length of the series of overlapping objects does not change.

B. SUMMARY OF THE INVENTION

It is an object of the device according to the present invention to overcome the above problem, i.e. to enable multiple transports with fully overlapping objects to be detected, even if the overlap remains total during the measurement.

Accordingly, a device according to the invention is characterised in that the device furthermore comprises:

- a detection means in the measurement path for observing a passing object or an object from a series of overlapping passing objects, which detection means emits a presence signal in response to the presence of a passing object or an object from a series of overlapping passing objects, and
- a sensor in the measurement path, the emitted signal of which is a measure for the passing speed of an object or of an object from a series of overlapping passing objects, while the braking device comprises a braking roller, which in the presence of an object in the measurement path is in contact with that object, and the braking device is arranged such that the braking roller is decelerated during a predetermined first time span between the beginning and the end of the presence signal and in a predetermined manner, whereby the device comprises means to determine the change in passing speed resulting from the deceleration of the braking roller. The invention is based on the understanding that it is possible to detect overlapping objects in a transport path by, in a measurement path, either decelerating a single object or decelerating one of a series of overlapping objects relative to the rest of the series and then determining the effect of the deceleration. If there is in fact overlapping of two or more objects, then this effect will be greater than if only one object is in the measurement path and there is therefore no overlapping, since in the case of overlapping the decelerated object will move relative to the rest of the series of overlapping objects and will therefore lag behind the rest.

According to a first preferred embodiment of the device according to the invention, the device is characterised in that the braking device is arranged such that the deceleration of the braking roller during the predetermined first time span takes place by decelerating the braking roller at least once for a predetermined second time span. In this embodiment the deceleration takes place in jerks, with one or more measured jerks. This enables the precision of the overlapping detection to be varied by adjusting the deceleration.

According to a second preferred embodiment of the device according to the invention, the device is characterised in that the braking roller is covered with friction material.

According to a third preferred embodiment of the device according to the invention, the device is characterised in that the braking device comprises an electric motor switched as a dynamo, as well as control means at whose command the dynamo is short-circuited during the predetermined first time span at least once for a second time span.

According to a fourth preferred embodiment of the device according to the invention, the device is characterised in that the device furthermore comprises thickness measuring means, which thickness measuring means are designed to emit a thickness signal that is a measure for the thickness of an object, or of a series of overlapping objects, in the transport path, whereby the braking device is arranged such that, depending on the thickness signal, the braking roller is decelerated for a shorter or longer time. This makes it possible for the deceleration to be adapted to the thickness of a series of passing objects such that the effect on a series of thin objects is comparable with that on a series of thick objects, by for example subjecting a series of thick objects (which in general will have a greater mass) to a longer deceleration.

Furthermore, a method according to the invention is characterised in that the following are also included in tile measurement path:

- a detection means for observing a passing object or an object from a series of overlapping passing objects, which detection means emits a presence signal in response to the presence of a passing object or an object from a series of overlapping passing objects, and
- a sensor, the emitted signal of which is a measure for the passing speed of an object or of an object from a series of overlapping passing objects, whereby the braking device comprises a braking roller, which in the presence of an object in the measurement path is in contact with that object, and whereby the method comprises the following steps:

a) the measurement to detect overlapping objects is started at the moment that the presence of an object is established by the detection means;

b) the braking roller is decelerated during a predetermined time span between the beginning and the end of the presence signal and in a predetermined manner;

c) with the aid of the sensor for the passing speed, the amount by which the passing speed decreases during the deceleration of the braking roller is established;

d) this amount is compared with a predetermined threshold value;

e) if the amount is higher than the threshold value, it is assumed that a series of overlapping objects is present and an overlap signal is generated, and if the amount is lower than or equal to the threshold value, it is assumed that there is no series of overlapping objects present and no overlap signal is generated.

C. BRIEF DESCRIPTION OF THE DRAWING

Figure 2:
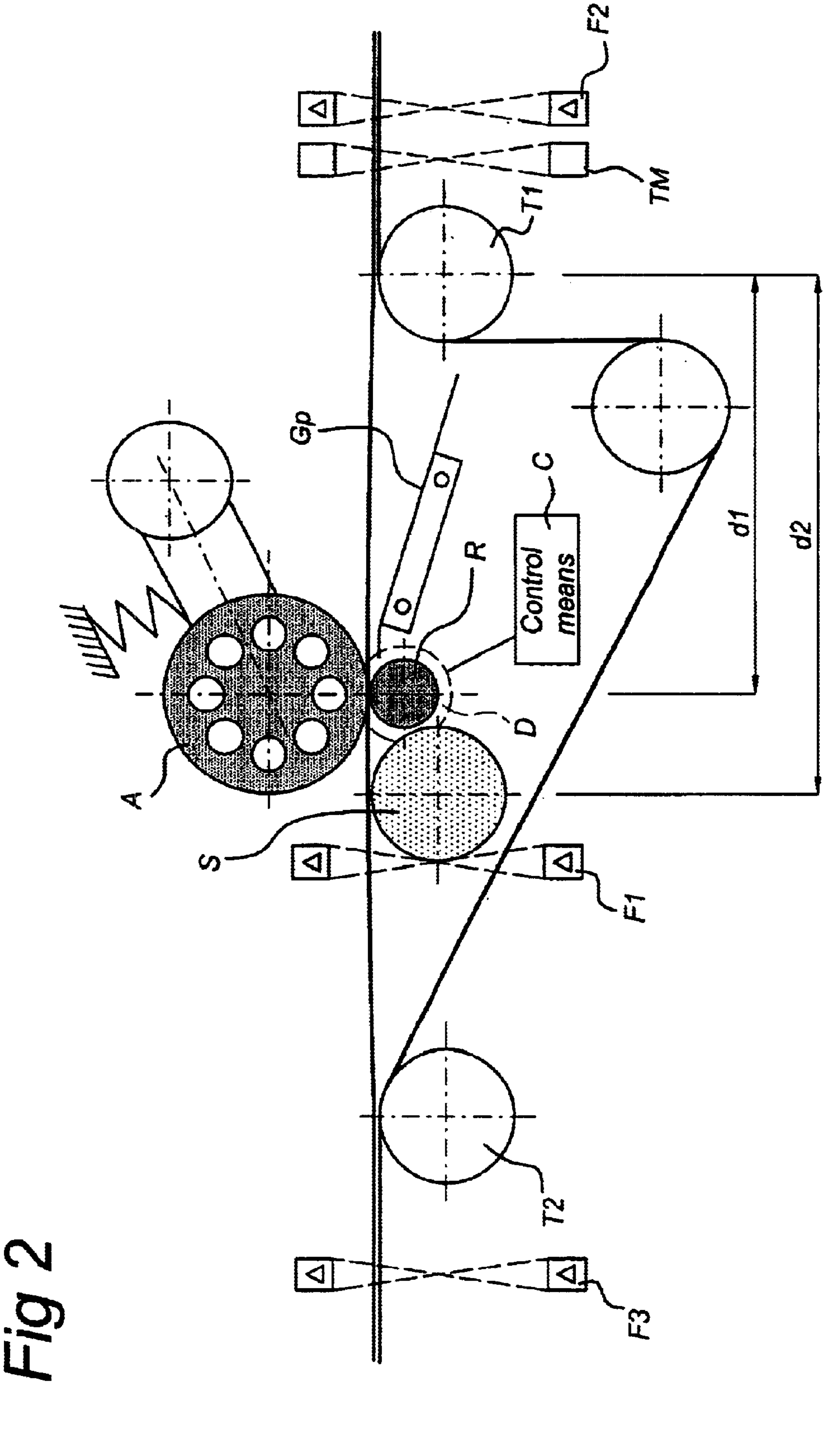

The invention will now be explained in more detail by means of a description of an embodiment with reference to a drawing, in which:

FIG. 1 shows a part of a transport path for flat objects, in which a device according to the invention is located, and FIG. 2 shows a device according to the invention, combined with means for ascertaining a length change.

D. DESCRIPTION OF AN EMBODIMENT

The device according to the invention can for example form part of a transport path in a sorting device for letters. In order to avoid incorrect sorting results in such a sorting device, with adverse consequences for the quality of the sorting process, it is important to establish in good time whether the letters are in fact transported individually and that no overlaps therefore occur. Moreover, such overlaps often lead to letters becoming jammed at switch points etc., requiring a machine to be temporarily stopped in order to identify and remedy the fault.

In FIG. 1 the actual measurement path is defined by the transport rollers (T1) and (T2). The distance between the rollers (T1) and (T2) is equal to at least the length of the longest letter. The guide plate (Gp) guides a letter to the following part of the measurement path. Here, at a distance (d1) after (T1), measured in the transport direction, is located a braking roller (R) covered with friction material. The braking roller (R) is connected to an electric motor switched as a dynamo (D), the connection being accomplished for example by means of a belt (or, as in the embodiment of FIG. 1, by providing the roller and dynamo with a common shaft). At the command of control means (C), the dynamo (D) can be short-circuited at any time for a number of milliseconds. Short-circuiting causes the braking roller (R) to slow down, resulting in a relative movement of letters in a series of overlapping letters, if there is any overlapping, or in a simple deceleration of a letter, if there is only one letter in the measurement path. The effect of a deceleration is measured with the aid of the sensor (S), at a distance (d2), measured in the transport direction, after roller (T1). The signal emitted by the sensor (S) is a measure for the transport speed of a letter in direct contact with the sensor. The sensor can, for example, take the form of a disk with perforations, a light source, a light detector and counting means, as known to those skilled in the art. A detection means (F) for observing a passing letter is also located in the measurement path. This detection means can, for example, comprise a photocell.

When a letter or a series of overlapping letters enters the measurement path, this is detected by detection means (F). The measurement starts at that moment. The speed of the braking roller (R) is regulated in the sense that during a predetermined time span and in a known manner the braking roller is decelerated to a lower peripheral speed. This deceleration can take place once or a number of times during the predetermined time span. In the described embodiment the deceleration is effected by short-circuiting the dynamo (D). The passing speed of a letter, with which the sensor (S) is in direct contact, is determined at a moment at which the braking roller (R) is not decelerated and also during a period or periods in which the braking roller is decelerated by short-circuiting the dynamo (D). From this, the difference in passing speed, as measured by the sensor (S), is determined in those different situations. This difference will, as a consequence of relative movement of the letters, be greater if there are overlapping letters in the measurement path. If the difference exceeds a predetermined value, it is assumed that there is a series of overlapping objects and an "overlap signal" is generated. It is obvious that a value of zero should not be chosen for the predetermined value, since otherwise differences that occur as a consequence of "settling" of the front and rear edges of a single transport during the deceleration by the braking roller could also be interpreted as being a consequence of overlapping.

In FIG. 2 a device according to the invention is combined with means for ascertaining a length change in the case of overlapping passing objects. For this purpose, a photocell (F2) is located in front of roller (T1), looking in the transport direction, and a photocell (F3) is located behind roller (T2). Photocell (F1) has the same function as photocell (F) in FIG. 1. Photocell (F2) is used for determining the length of a letter or a series of overlapping letters before the measurement of relative movement, and photocell (F3) for determining the length after the measurement. In this embodiment, an additional overlap signal is generated if partial overlapping occurs or if a total overlap between the measuring points changes into a partial overlap.

The device may furthermore comprise thickness measuring means (TM). These thickness measuring means (TM) are designed to emit a thickness signal that is a measure for the thickness of an object, or of a series of overlapping objects, in the transport path. The braking roller (R) is arranged such that, depending on the thickness signal, the braking roller (R) is decelerated for a shorter or longer time. This makes it possible for the deceleration to be adapted to the thickness of a series of passing objects such that the effect on a series of thin objects is comparable with that on a series of thick objects, by for example subjecting a series of thick objects (which in general will have a greater mass) to a longer deceleration.

What is claimed is:

1. Device for detecting overlapping objects in a transport path for flat objects, such as letters etc., whereby the transport path comprises a measurement path, in which measurement path a braking device is located by which a passing object or an object from a series of overlapping passing objects is decelerated in the measurement path, wherein the device comprises:

a detection means in the measurement path for observing a passing object or an object from a series of overlapping passing objects, which detection means emits a presence signal in response to the presence of a passing object or an object from a series of overlapping passing objects, and a sensor in the measurement path, the emitted signal of which is a measure for the passing speed of an object or of an object from a series of overlapping passing objects, while the braking device comprises a braking roller, which in the presence of an object in the measurement path is in contact with that object, and the braking device is arranged such that the braking roller is decelerated during a predetermined first time span between the beginning and the end of the presence signal and in a predetermined manner, whereby the device comprises means to determine the change in passing speed resulting from the deceleration of the braking roller.

2. Device according to claim 1, wherein the braking device is arranged such that the deceleration of the braking roller during the predetermined first time span is effected by decelerating the braking roller at least once, during a predetermined second time span.

3. Device according to claim 1, wherein the braking roller is covered with friction material.

4. Device according to claim 1, wherein the braking device comprises an electric motor switched as a dynamo, as well as control means at whose command the dynamo is short-circuited during the predetermined first time span at least once for a second time span.

5. Device according to claim 1, wherein the device furthermore comprises thickness measuring means, which thickness measuring means are arranged to emit a thickness signal that is a measure for the thickness of an object, or of a series of overlapping objects, in the transport path, whereby the braking device is arranged such that, depending on the thickness signal, the braking roller is decelerated for a shorter or longer time.

6. Device according to claim 2, wherein the braking roller is covered with friction material.

7. Device according to claim 2, wherein the braking device comprises an electric motor switched as a dynamo, as well as control means at whose command the dynamo is short-circuited during the predetermined first time span at least once for a second time span.

8. Device according to claim 3, wherein the braking device comprises an electric motor switched as a dynamo, as well as control means at whose command the dynamo is short-circuited during the predetermined first time span at least once for a second time span.

9. Method for detecting overlapping objects in a transport path for flat objects, such as letters etc., whereby the transport path comprises a measurement path, in which measurement path a braking device is located by which a passing object or an object from a series of overlapping passing objects is decelerated in the measurement path, wherein the following are also included in the measurement path:

a detection means for observing a passing object or an object from a series of overlapping passing objects, which detection means emits a presence signal in response to the presence of a passing object or an object from a series of overlapping passing objects, and a sensor, the emitted signal of which is a measure for the passing speed of an object or of an object from a series of overlapping passing objects, whereby the braking device comprises a braking roller, which in the presence of an object in the measurement path is in contact with that object, and whereby the method comprises the following steps:

a) the measurement to detect overlapping objects is started at the moment that the presence of an object is established by the detection means;

b) the braking roller is decelerated during a predetermined time span between the beginning and the end of the presence signal and in a predetermined manner;

c) with the aid of the sensor for the passing speed, the amount by which the passing speed decreases during the deceleration of the braking roller is determined;

d) this amount is compared with a predetermined threshold value;

e) if the amount is higher than the threshold value, it is assumed that a series of overlapping objects is present and an overlap signal is generated, and if the amount is lower than or equal to the threshold value, it is assumed that there is no series of overlapping objects present and no overlap signal is generated.

10. Method according to claim 9, wherein the deceleration of the braking roller during the predetermined first time span is effected by decelerating the braking roller at least once, during a predetermined second time span.

11. Method according to claim 9, wherein the braking roller is covered with friction material.

12. Method according to claim 9, wherein the braking device comprises an electric motor switched as a dynamo, as well as control means for short-circuiting the dynamo and whereby the deceleration of the braking roller is effected by short-circuiting the dynamo.

13. Method according to claim 9, wherein the device furthermore comprises thickness measuring means, which thickness measuring means are arranged to emit a thickness signal that is a measure for the thickness of an object, or of a series of overlapping objects, in the transport path, whereby during the period between the beginning and the end of the presence signal the braking roller is pressed more or less strongly against passing objects, depending on the thickness signal.

14. Method according to claim 10, wherein the braking roller is covered with friction material.

15. A device for detecting overlapping flat objects, said device comprising:

a measurement path along which a moving object passes;

a braking device for decelerating said object in said measurement path;

a detector in said measurement path that detects said moving object and emits a presence signal in response to the presence of said moving object;

a sensor in said measurement path that emits a speed signal that is a measurement of a speed of said object passing said sensor, wherein said braking device comprises a braking roller that directly contacts said object, said braking device is structured and arranged so that said braking roller is decelerated during a first time period between a beginning and an end of the presence signal, such that the device determines a change in the passing speed based on the deceleration of the braking roller.

* * * * *